(12) United States Patent
Redden

(10) Patent No.: US 11,602,962 B2
(45) Date of Patent: Mar. 14, 2023

(54) ARTICULATED SAFETY HITCH

(71) Applicant: Milton J. Redden, McDonald, PA (US)

(72) Inventor: Milton J. Redden, McDonald, PA (US)

(*) Notice: Subject to any disclaimer, the term of this patent is extended or adjusted under 35 U.S.C. 154(b) by 0 days.

(21) Appl. No.: 17/685,618

(22) Filed: Mar. 3, 2022

(65) Prior Publication Data
US 2022/0281272 A1  Sep. 8, 2022

Related U.S. Application Data

(60) Provisional application No. 63/156,106, filed on Mar. 3, 2021.

(51) Int. Cl.
*B60D 1/28* (2006.01)
*B60D 1/24* (2006.01)
*B60D 1/36* (2006.01)

(52) U.S. Cl.
CPC ............ *B60D 1/28* (2013.01); *B60D 1/243* (2013.01); *B60D 1/36* (2013.01)

(58) Field of Classification Search
CPC . B60D 1/28; B60D 1/243; B60D 1/36; B60D 1/02; B60D 1/52
See application file for complete search history.

(56) References Cited

U.S. PATENT DOCUMENTS

| 3,615,055 | A | * | 10/1971 | Van Der Lely et al. ............... A01C 17/00 239/665 |
| 3,730,557 | A | | 5/1973 | Cox |
| 4,711,461 | A | * | 12/1987 | Fromberg ................ B60D 1/02 403/57 |
| 5,393,162 | A | | 2/1995 | Nissen |
| 5,765,851 | A | * | 6/1998 | Parent .................... B60D 1/167 280/491.4 |
| D737,734 | S | * | 9/2015 | McGinnes .................. D12/162 |
| 2004/0061399 | A1 | | 4/2004 | Shoffner |
| 2012/0007337 | A1 | * | 1/2012 | McGinnes ............... B60D 1/52 280/456.1 |
| 2019/0105955 | A1 | | 4/2019 | Crane |
| 2020/0352084 | A1 | * | 11/2020 | Letscher .............. A01B 59/066 |

FOREIGN PATENT DOCUMENTS

| CN | 2617607 Y | 5/2004 |
| WO | WO 2013072854 A1 | 5/2013 |

* cited by examiner

*Primary Examiner* — Kevin Hurley
*Assistant Examiner* — Marlon A Arce
(74) *Attorney, Agent, or Firm* — Gwen R. Acker Wood; Acker Wood IP Law, LLC

(57) ABSTRACT

The present invention provides an articulated safety hitch which is a more secure and flexible replacement for the conventional hitch and ball towing systems long used in light to heavy duty towing, thus improving safety, longevity, strength, serviceability, and ease of manufacture. Instead of a single ball typically used in conventional hitch and ball towing systems, the inventive articulated safety hitch can move in all directions with wide bearing separation and without binding up or slipping off. In addition, the inventive articulated safety hitch is simple to build and uses readily available, off-the-shelf components as wearable items, such as existing trailer tongues and ball coupler designs.

19 Claims, 6 Drawing Sheets

ARTICULATED SAFETY HITCH

CROSS REFERENCE TO RELATED APPLICATIONS

The present application claims priority to U.S. Provisional Application No. 63/153,106 filed Jun. Mar. 3, 2021, which is incorporated herein by reference in its entirety.

FIELD OF THE INVENTION

The present invention relates to towing systems for vehicles and, in particular, to an articulated safety hitch towing system that articulates in all directions to provide a safe, secure, flexible hitch for light to heavy duty towing.

BACKGROUND OF THE INVENTION

A typical trailer hitch is a device which attaches to the chassis of a vehicle for towing. A trailer hitch can take the form of a tow ball to allow swiveling and articulation of a trailer, a tow pin or a tow hook with a trailer loop, which are used for large or agricultural vehicles where slack in the pivot pin allows similar movements.

Trailer hitches for conventional passenger cars, light-duty commercial vehicles, light trucks, and multipurpose passenger vehicles come in two main types: receiver and bumper/fixed-drawbar. Receiver-type hitches consist of a portion with a rearward-facing opening that accepts removable hitch-mounted accessories such as trailer hitch ball mounts, hitch bike racks, cargo carriers and the like. Bumper/fixed-drawbar type hitches typically are built as one piece, have one or more integrated holes for the trailer ball mount, and generally are not compatible with aftermarket hitch-mounted accessories.

There are many safety considerations for proper towing of a trailer or caravan, starting with vehicle towing capacity and ranging through equalizer hitches to properly and legally connecting safety chains. According to the United States National Highway Traffic Safety Association, more than 50,000 crashes involving passenger vehicles towing trailers occur every year.

There exists a need, therefore, for a safe, secure, but flexible replacement for currently available hitch and ball towing systems currently used in light to heavy duty towing.

SUMMARY OF THE INVENTION

The present invention fulfills this need by providing an articulated safety hitch which is a more secure and flexible replacement compared to common hitch and ball towing systems long used in light to heavy duty towing, thus improving safety, longevity, strength, serviceability, and ease of manufacture. Instead of a single ball typically used in conventional hitch and ball towing systems, the inventive safety hitch can move in all directions without binding up or slipping off. In addition, the inventive safety hitch is simple to build and uses readily available, off-the-shelf components as wearable items such as existing trailer tongues and ball coupler designs.

In an aspect of the invention, there is provided an articulated safety hitch for moderate loads comprising a pair of identical sheet metal yokes, each metal yoke having a yoke base and a yoke end; a pair of identical round tubular yokes, the pair of identical round tubular yokes connecting the pair of sheet metal yokes to one another at their yoke bases so that the pair of sheet metal yokes is pivotable to form a roll axis and roll pivot; and a pair of identical round tubes, each one of the pair of round tubes located at one of the pair of yoke ends, each of the identical round tubes welded to a square tube, each of the square tubes interfacing with a hitch receiver tube of a towing vehicle or trailer to form a pitch axis and pitch pivot and a yaw axis and yaw pivot, wherein the yaw pivot, the pitch pivot and the roll pivot are comprised of using identical bolts comprised of bearing plate washers and a pair of spring washer stackups that ride atop the pair of identical roll axis bearings.

In another aspect of the invention, there is provided an articulated safety hitch for high loads, comprising a yaw axis boss having a pair of greaseable roll axis bearings; a tube; a yaw pivot bolt; a fixed bearing spacer; a sliding bearer spacer; a yaw/roll yoke; a threaded bearing preload adjustment nut; a roll axis pivot axle having a pair of greaseable roller bearings; a safety bearing plate washer; a locking nut; a pitch pivot comprised of a removable pin with a flat on its insertable end; a pitch boss; and an attached plate, wherein the yaw axis boss with its pair of greaseable roll axis bearings is attached to a tube to interface with a hitch receiver tube located in the towing vehicle, wherein the yaw axis boss uses the yaw pivot bolt as a yaw pivot, said yaw pivot bolt used to clamp the fixed bearing spacer through the pair of roll axis bearings in the yaw axis boss and through the sliding bearing spacer within the yaw/roll yoke, said yaw pivot bolt tensioned with a washer and a locknut, wherein the threaded bearing preload adjustment nut is located within a yaw axis bore on the yaw/roll yoke, wherein the threaded bearing preload adjustment nut threads into a corresponding bore of the yaw/roll yoke, the sliding bearing space riding within the yaw/roll yoke, the yaw/roll yoke configured to accept the pair of greaseable bearings in order to bear the roll axis pivot axle, wherein the safety bearing plate washer is located on the roll axis pivot axle, wherein perpendicular to and at the opposite end of the threaded preload adjustment nut, there is located the roll axis pivot axle with its pair of greaseable roller bearings for the pitch pivot, said pitch pivot captured by the pitch boss which is attached to an interface of a trailer tongue.

In a further aspect of the invention, there is provided an articulated safety hitch for very high loads, comprising a machined yaw axis boss having a pair of greaseable, tapered roller or ball bearings; a yaw axis boss; an adapted recess spacer; a fixed bearing spacer; a sliding bearing spacer; and a shim stack, wherein the machined yaw axis boss with the pair of greaseable, tapered roller or ball bearings is attached to a tube that interfaces with a hitch receiver tube located in a towing vehicle, wherein the yaw axis boss uses a bolt as the yaw pivot, said yaw axis boss mounted on the pair of tapered roller or ball bearings, wherein the yaw axis boss is located within the adapted recess spacer, said yaw axis boss clamping the fixed bearing spacer through the yaw axis boss mounted on the pair of tapered roller or ball bearings and the sliding bearing spacer with a yaw/roll yoke and tensioned with a washer and a locking nut, wherein the shim stack is located within a yaw axis bore on the yaw/roll yoke between the sliding bearer spacer and the washer, wherein perpendicular to and at the opposite end of the threaded preload adjustment nut, the roll axis pivot axle has a pair of greaseable roll axis bearings for the pitch pivot, said pitch pivot being captured by a pitch boss that is attached to a drop adjustable interface to a trailer ball coupler, said pitch pivot having a lead in at the tip to ease hitch-up in the field and said pitch boss having a lead in to accept the pair of roll axis bearings in the roll axis pivot axle.

BRIEF DESCRIPTION OF THE DRAWINGS

For the present disclosure to be easily understood and readily practiced, the present disclosure will be described for purposes of illustration and not limitation in connection with the following figures, where like reference numerals refer to identical or functionally similar elements throughout the separate views, wherein.

DETAILED DESCRIPTION OF THE INVENTION

Figure 1:
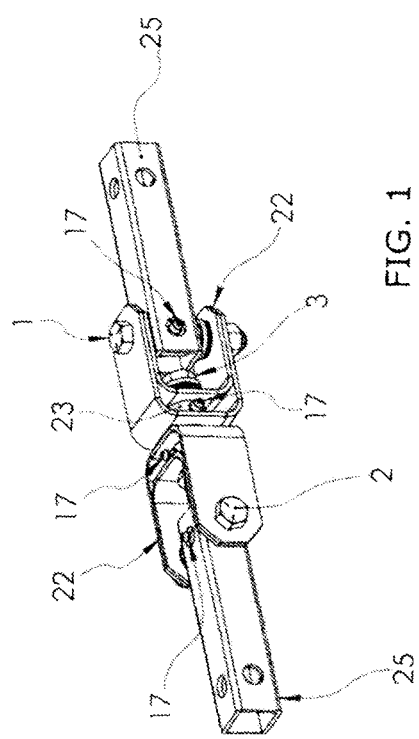
FIG. 1 is a perspective view of the articulated safety hitch, in accordance with one embodiment of the invention.
Figure 2:
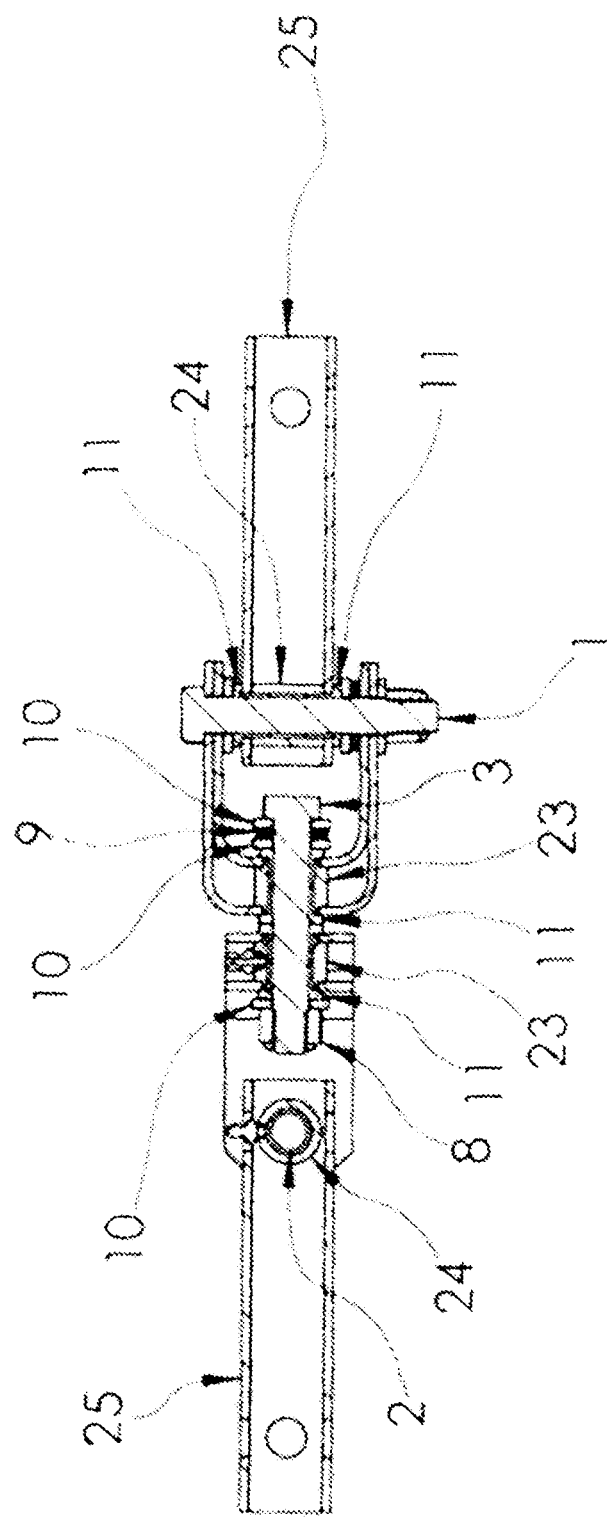
FIG. 2 is a cross-sectional view of the articulated safety hitch of FIG. 1.

Referring now to FIGS. 1 and 2, in one embodiment of the invention, the articulated safety hitch is a very low-cost, moderate load, symmetrical hitch with plain bearings throughout. The body of the articulated safety hitch comprises a pair of identical sheet metal yokes 22 and round tubular yokes 23, which pivot and connect through their round tubes at the yoke bases to form the roll axis and also through their respective yoke ends into identical round tubes 24, welded or swaged into square tubes 25, which interface directly with an existing hitch receiver tube in the towing vehicle and trailer to form the pitch and yaw axes. The yaw pivot 1, the pitch pivot 2, and the roll pivot 3 are comprised of using identical bolts comprised of bearing plate washers 10 and a pair of spring washer stackups 9 riding on a pair of identical roll axis bearings 11. Each stackup 9 is retained and tensioned by a locking nut 8 and a bearing plate washer 10 on the yaw, pitch and roll pivot bolts 1, 2, 3. All round tube housing pivots have grease fittings 17.

In this embodiment of the invention, the hitch is disconnected from the towing vehicle through a traditional receiver tube, entirely replacing a ball and a receiver. This embodiment is light, compact, and inexpensive, and is intended to be built directly into the towed vehicle. It is ideal for all-terrain vehicles (ATVs), utility task vehicles (UTVs), and off-road use where tongue weight is manageable and manipulation of the hitch into the receiver can be done easily. In addition, this embodiment is symmetrical and, in off-road use, is installed so that the pitch axis is closest to the towing vehicle.

Figure 3:
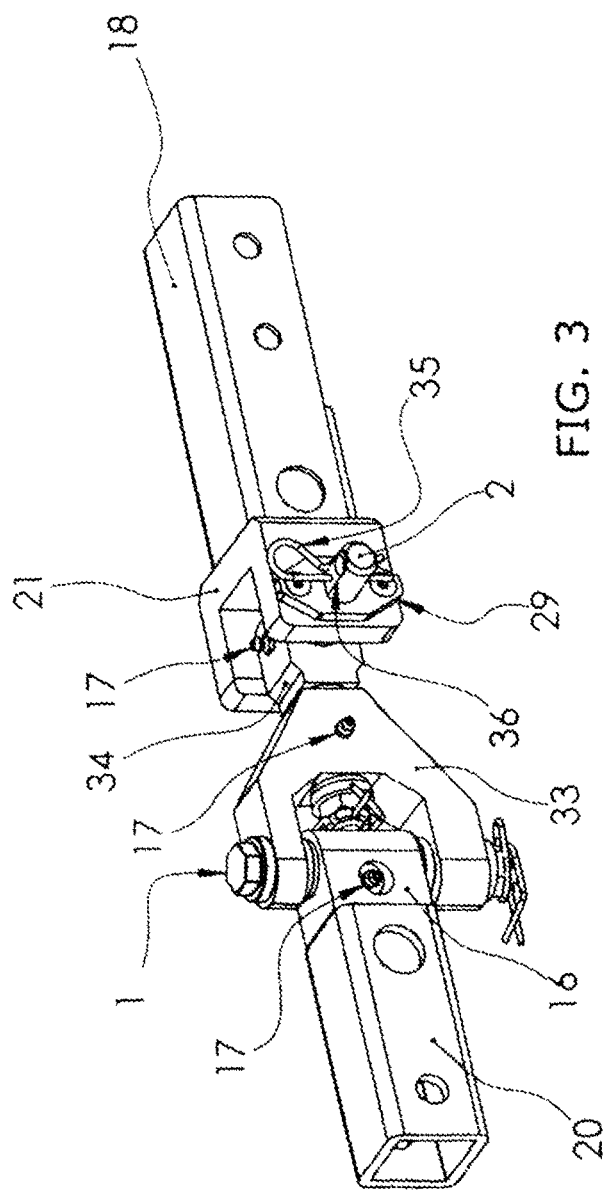
FIG. 3 is a perspective view in accordance with another embodiment of the articulated safety hitch of the invention.
Figure 4:
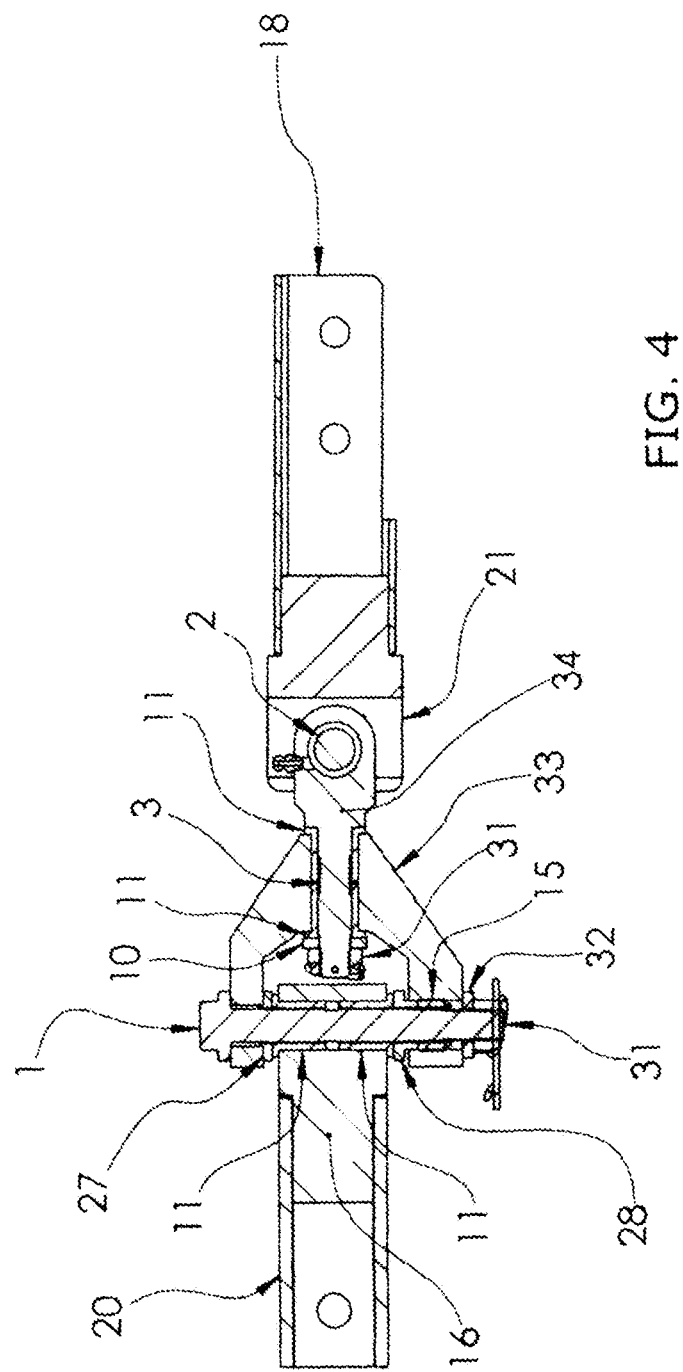
FIG. 4 is a cross-sectional view of the articulated safety hitch of FIG. 3.

Shown in FIGS. 3 and 4 is another embodiment of the invention, which is a moderate-cost, machined element hitch having a disconnect feature in the pitch axis and plain bearings throughout. For tighter tolerances and higher loads, a machined yaw axis boss 16, having a pair of greaseable 17 mounted, roll axis bearings 11, is attached to a tube 20 to interface with an existing hitch receiver tube in the towing vehicle. This yaw axis boss 16 uses a bolt as the yaw pivot 1, clamping a fixed bearing spacer 27 through the mounted pair of roll axis bearings 11 in the yaw axis boss 16 and through a sliding bearing spacer 28 within a yaw/roll yoke 33 and tensioned with a washer 32 and a locking nut 31. Within a yaw axis bore on the yaw/roll yoke 33 is a threaded bearing preload adjustment nut 15 that threads into a corresponding bore of the yaw/roll yoke 33 which the sliding bearing spacer 28 rides within. This threaded bearing preload adjuster nut 15 sets the bearing preload independent of the torque applied on the bolt of the yaw pivot 1. This preload arrangement may be replaced with a spacer and shim stack as displayed in a further embodiment, described below. The yaw/roll yoke 33 is configured to accept the pair of greaseable 17 roll axis bearings 11 in order to bear a roll axis pivot axle 34. The roll axis pivot axle 34 has a safety bearing plate washer 10 so, in the event of bearing failure, it does not pass through the bore of the yaw/roll yoke 33 and the locking nut 31 to preload the pair of roll axis bearings 11. Perpendicular to and at the opposite end of the threaded preload adjustment nut 15, the roll axis pivot axle 34 has a pair of greaseable 17 tapered roller or ball bearings 37 for the pitch pivot 2. The pitch pivot 2 is captured by a pitch boss 21 that is attached to a drop adjustable interface 18 to a trailer tongue. This interface 18 may be replaced with a ball coupler interface, again as shown in the further embodiment described below. The pitch pivot 2 comprises a removable pin with a flat on the insertable end to inhibit rotation. This flat engages with a part of the pitch boss 21 or a part of an attached plate 29. The removable pin is not tensioned and may be secured by a pin, quick release, or other traditional means, including secondary security features. The pitch pivot pin 2 has a lead in to ease hitch-up in the field. The pitch boss 21 has a lead in to accept the pair of roll axis bearings 11 in the roll axis pivot axle 34 and is dimensioned to leave a small amount of clearance between flanges of the pair of roll axis bearings 11 and the interior of the pitch boss 21 to facilitate hitch-up.

Figure 5:
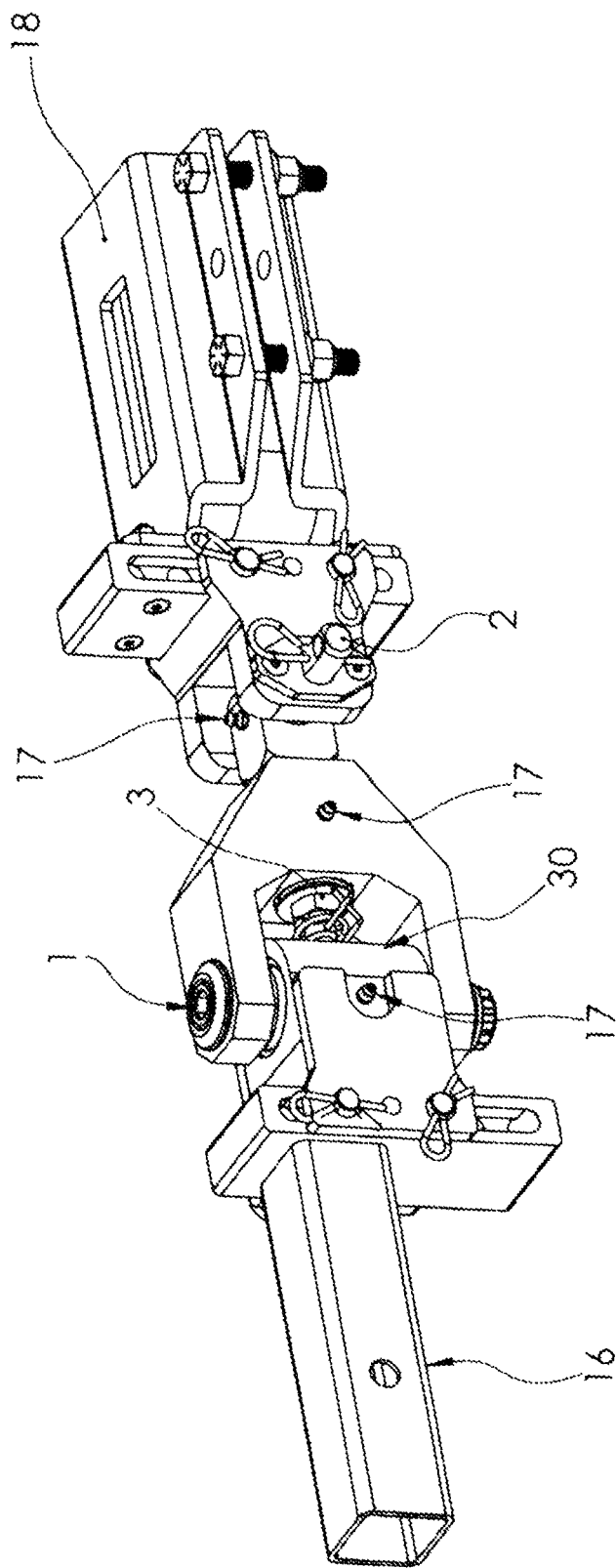
FIG. 5 is a perspective view in accordance with a further embodiment of the articulated safety hitch of the invention.
Figure 6:
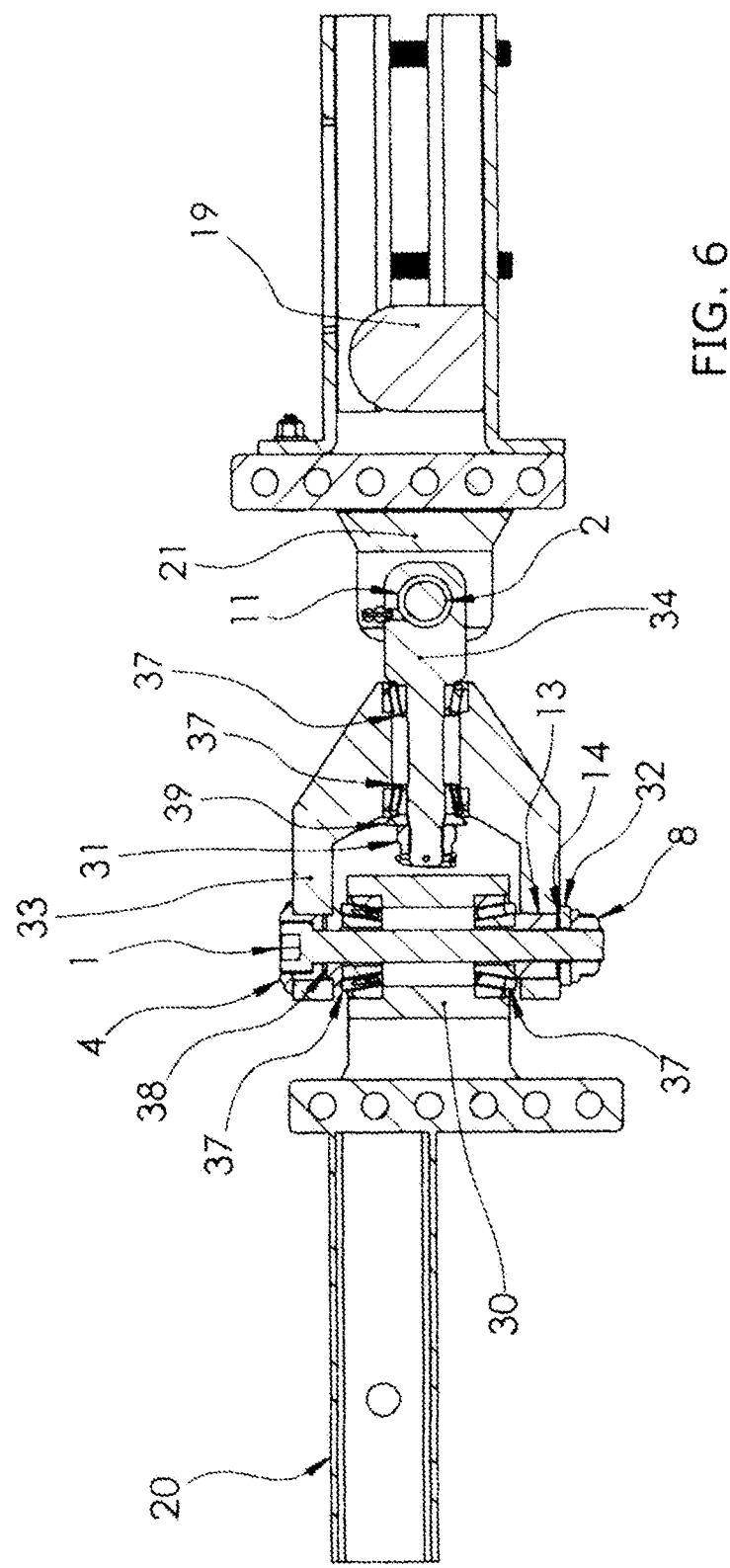
FIG. 6 is a cross-sectional view of the articulated safety hitch of FIG. 5.

Shown in FIGS. 5 and 6 is a further embodiment of the invention, which is a higher cost, machined element articulated safety hitch compared to the other two embodiments. The articulated safety hitch has a disconnect feature in the pitch axis and a pair of tapered roller bearings on the yaw and roll axes for even tighter tolerances, higher loads, and less friction than the other two embodiments. A machined yaw axis boss 30 having a pair of greaseable 17 tapered roller or ball bearings 37 is attached to the tube 20 that interfaces with an existing hitch receiver tube in the towing vehicle. The yaw axis boss 30 uses a bolt as the yaw pivot 1. The yaw axis boss 30 is in an adapted recess spacer 4 and clamps a fixed bearing spacer 38 through the yaw axis boss 30 mounted on the pair of tapered roller or ball bearings 37 and a sliding bearing spacer 13 with the yaw/roll yoke 33 and tensioned with a washer 32 and a locking nut 8.

Within the yaw axis bore on the yaw/roll yoke 33, between the sliding bearing spacer 13 and the washer 32, is a shim stack 14 that is used to set the bearing preload independent of the yaw pivot 1 bolt tension. This preload arrangement may be replaced with a threaded yoke and adjuster, as discussed in the previous embodiment. The yaw/roll yoke 33 is configured to accept the pair of greaseable 17 roller or ball bearings 37 in order to bear the roll axis pivot axle 34. The roll axis pivot axle 34 has a safety bearing spacer 39 so that in the event of bearing failure it does not pass through the bore of the yoke 33 and the locking nut 31 to preload the pair of tapered roller or ball bearings 37. Perpendicular to and at the opposite end of the threaded preload adjustment nut 15, the roll axis pivot axle 34 has a pair of greaseable 17 roll axis bearings 11 for the pitch pivot 2. The pitch pivot 2 is captured by a pitch boss 21 that is attached to a drop adjustable interface 19 to a trailer ball coupler. The interface 19 may be replaced with a trailer tongue interface as described above in the previous embodiment. The pitch pivot 2 is a removable pin with a flat on the insertable end to inhibit rotation. This flat engages with a part of the pitch boss 21 or a part of an attached plate 29. The pin is not tensioned and may be secured by a pin, quick release or other traditional means, including secondary security features. The pitch pivot 2 pin has a lead in at its tip to ease hitch-up in the field. The pitch boss 21 has a lead in to accept the pair of roll axis bearings 11 in the roll axis pivot axle 34 and is dimensioned to leave a small amount of clearance between flanges of the pair of roll axis bearings 11 and the interior of the pitch boss 21 to facilitate hitch-up.

In this embodiment, the towing hitch employs simple mechanisms of existing pivot schemes implemented in different ways to separate articulation into three discreet axes. This adds length to the device over a single pivot point but maximizes mechanical articulation range and serviceability over cost and ease of use.

In order to simplify manufacture, the articulation of the hitches of the various embodiments are separated into discreet axes comprised of similar componentry: the roll axis coupling, a yaw and a pitch axis. From the towing vehicle to the vehicle being towed, they generally are in the order of yaw-roll-pitch. When used in off-road situations, the pitch and yaw are reversed in order, so that the pitch is the prioritized axis nearest to the towing vehicle, whereas on paved roads, the pitch clearance carries less priority than yaw clearance between the vehicles.

The invention provides major safety improvements to the towing vehicle by increasing the ability of the towed vehicle to roll without transferring this rolling to the towing vehicle, as well as an inability for the hitch to disconnect itself. In a dramatic incident, the towed vehicle and the towing vehicle remain connected, but the articulation separates the pivoting motions from the two vehicles.

The pivoting axes of the invention each use separated, a pair of preloaded bearings, balls, rollers, or a pair of plain bearings to pivot around a particular axis. Thus, the forces involved also are separated and easy to calculate, which allows the design to be easily tailored to unique loads or different scales. Preload mechanisms and grease points for the bearings provide negligible play, which minimizes wear and noise in the coupling and allow seals or sealed bearings to be used for increased longevity.

It will be appreciated by those skilled in the art that changes could be made to the embodiments described above without departing from the broad inventive concept thereof. It is understood, therefore, that this invention is not limited to the particular embodiments disclosed, but it is intended to cover modifications that are within the spirit and scope of the invention, as defined by the appended claims.

What is claimed is:

1. An articulated safety hitch for moderate loads, comprising:
   a pair of identical sheet metal yokes, each metal yoke having a yoke base and a yoke end;
   a pair of identical round tubular yokes, said pair of identical round tubular yokes connecting the pair of sheet metal yokes to one another at their yoke bases so that the pair of sheet metal yokes is pivotable to form a roll axis and roll pivot; and
   a pair of identical round tubes, each one of the pair of round tubes located at one of the pair of yoke ends, each of said identical round tubes welded to a square tube, each of the square tubes interfacing with a hitch receiver tube of a towing vehicle or trailer to form a pitch axis and pitch pivot and a yaw axis and yaw pivot,
   wherein the yaw pivot, the pitch pivot and the roll pivot are comprised of using identical bolts on each pivot, each of said bolts having bearing plate washers and a pair of spring washer stackups that ride atop a pair of identical roll axis bearings, wherein pivoting axes of the safety hitch each use separate pairs of preloaded bearings, balls or rollers to pivot around a particular axis so that the forces on the safety hitch also are separated and easy to calculate, which allows the hitch to easily be tailored to unique loads or different scales.

2. The articulated safety hitch of claim 1, wherein each of the pair of spring washer stackups is attached and tension-secured by a locking nut and a washer.

3. The articulated safety hitch of claim 1, wherein the hitch is disconnected from a towing vehicle through the receiver tube which replaces a ball and a receiver.

4. The articulated safety hitch of claim 1, wherein the hitch is built directly into a towed vehicle.

5. The articulated safety hitch of claim 1, wherein towing vehicles that may be used with the hitch comprise cars, trailers, trucks, all-terrain vehicles, utility task vehicles, wherein the hitch also is configured for off-road use.

6. The articulated safety hitch of claim 1, wherein the hitch is symmetrical and in off-road use is installed with the pitch axis being adjacent to a towed vehicle.

7. The articulated safety hitch of claim 1, wherein articulation of the hitch is separated into three discreet axes which adds length to the hitch over a single pivot point.

8. The articulated safety hitch of claim 1, wherein safety features of the hitch comprise increased ability of a towed vehicle to roll without transferring the rolling to a towing vehicle, and ability of the hitch to stay connected with the towed and the towing vehicle in an accident while at the same time having the hitch articulate in all directions.

9. An articulated safety hitch for high loads, comprising:
   a yaw axis boss having a pair of greaseable roll axis bearings;
   a tube;
   a yaw pivot bolt;
   a fixed bearing spacer;
   a sliding bearer spacer;
   a yaw/roll yoke;
   a threaded bearing preload adjustment nut;
   a roll axis pivot axle having a pair of greaseable roller bearings;
   safety bearing plate washer;
   a locking nut;
   a pitch pivot comprised of a removable pin with a flat on its insertable end;
   a pitch boss; and
   an attached plate,
   wherein the yaw axis boss with its pair of greaseable roll axis bearings is attached to a tube to interface with a hitch receiver tube located in the towing vehicle, wherein the yaw axis boss uses the yaw pivot bolt as a yaw pivot, said yaw pivot bolt used to clamp the fixed bearing spacer through the pair of roll axis bearings in the yaw axis boss and through the sliding bearing spacer within the yaw/roll yoke, said yaw pivot bolt tensioned with a washer and a locknut, wherein the threaded bearing preload adjustment nut is located within a yaw axis bore on the yaw/roll yoke, wherein the threaded bearing preload adjustment nut threads into a corresponding bore of the yaw/roll yoke, said sliding bearing space riding within the yaw/roll yoke, said yaw/roll yoke configured to accept the pair of greaseable bearings in order to bear the roll axis pivot axle, wherein the safety bearing plate washer is located on the roll axis pivot axle, wherein perpendicular to and at the opposite end of the threaded preload adjustment nut, there is located the roll axis pivot axle with its pair of greaseable roller bearings for the pitch pivot, said pitch pivot captured by the pitch boss which is attached to an interface of a trailer tongue.

10. The articulated safety hitch for high loads of claim 9, wherein the threaded adjuster nut sets the bearing preload independent of torque that is applied on the yaw pivot bolt.

11. The articulated safety hitch for high loads of claim 9, wherein in the event of bearing failure, the safety bearing plate washer is configured to prevent the roll axis pivot axle from passing through the bore of the yaw/roll yoke and the locking nut to preload the pair of roll axis bearings.

12. The articulated safety hitch for high loads of claim 9, wherein the pitch pivot comprising the removable pin with the flat on the insertable end of the pin is configured to inhibit rotation of the pitch pivot by engaging with a part of the pitch boss or a part of the attached plate.

13. The articulated safety hitch for high loads of claim 9, wherein the pitch boss has a lead in to accept the pair of bearings in the roll axis pivot axle and is dimensioned to leave a small amount of clearance between flanges of the pair of bearings and an interior of the pitch boss in order to facilitate hitch-up.

14. An articulated safety hitch for very high loads, comprising:
  a machined yaw axis boss having a pair of greaseable, tapered roller or ball bearings;
  a yaw axis boss;
  an adapted recess spacer;
  a fixed bearing spacer;
  a sliding bearing spacer; and
  a shim stack,
  wherein the machined yaw axis boss with a pair of greaseable, tapered roller or ball bearings is attached to a tube that interfaces with a hitch receiver tube located in a towing vehicle, wherein the yaw axis boss uses a bolt for a yaw pivot, said yaw axis boss mounted on the tapered roller or ball bearing pair, wherein the yaw axis boss is located within the adapted recess spacer, said yaw axis boss clamping the fixed bearing spacer through the yaw axis boss mounted on the pair of tapered roller or ball bearings and the sliding bearing spacer with a yaw/roll yoke and tensioned with a washer and a locking nut, wherein the shim stack is located within a yaw axis bore on the yaw/roll yoke between the sliding bearer spacer and the washer, wherein perpendicular to and at the opposite end of a threaded preload adjustment nut, a roll axis pivot axle has a pair of greaseable roll axis bearings for a pitch pivot, said pitch pivot being captured by a pitch boss that is attached to a drop adjustable interface to a trailer ball coupler, said pitch pivot having a lead in at the tip to ease hitch-up in the field and said pitch boss having a lead in to accept the pair of roll axis bearings in the roll axis pivot axle.

15. The articulated safety hitch for very high loads of claim 14, wherein the pitch pivot comprises a removable pin with a flat on the insertable end to inhibit rotation, said flat engaging with a part of the pitch boss or a part of an attached plate, wherein the removable pin is not tensioned and may be secured by a pin or by quick release or secondary security features.

16. The articulated safety hitch for very high loads of claim 14, wherein the yaw/roll yoke is configured to accept the pair of greaseable roller or ball bearings in order to bear the roll axis pivot axle.

17. The articulated safety hitch for very high loads of claim 14, wherein the roll axis pivot axle has a safety bearing spacer so that in the event of bearing failure the roll axis pivot axle does not pass through the bore of the yaw axis bore and the locking nut to preload the pair of tapered roller or ball bearings.

18. The articulated safety hitch for very high loads of claim 14, wherein the pitch pivot pin has a lead in at its tip to ease hitch-up in the field, has a lead in to accept the pair of roll axis bearings 11 in the roll axis pivot axle, and is dimensioned to leave a small amount of clearance between flanges of the pair of roll axis bearings and the interior of the pitch boss in order to facilitate hitch-up.

19. The articulated safety hitch for very high loads of claim 14, wherein the hitch has a disconnect feature in the pitch axis and in the pairs of tapered roller or ball bearings on the yaw and roll axes to accommodate high tolerances, heavy loads, and low friction.

* * * * *